've/p>

3,441,554
THIADIAZOLE MONOAZO DYES

Erwin Hahn, Viernheim, Hesse, and Hans Guenter Wippel, Ludwigshafen (Rhine), Germany, assignors to Badische Anilin- & Soda-Fabrik Aktiengesellschaft, Ludwigshafen (Rhine), Germany
No Drawing. Filed Nov. 22, 1966, Ser. No. 596,058
Claims priority, application Germany, Dec. 3, 1965, B 84,820
Int. Cl. C09b 29/36
U.S. Cl. 260—158         5 Claims This invention relates to new water-insoluble monoazo dyes having the general formula:

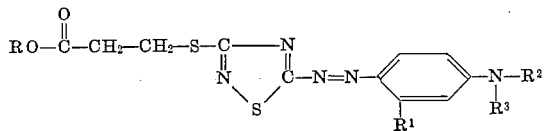

in which:

R denotes a methyl or ethyl group;
$R^1$ denotes a hydrogen atom, a chlorine atom or a methyl group;
$R^2$ denotes a β-acetoxyethyl, β-propionyloxyethyl, β-carbomethoxyethyl, β-carboethoxyethyl or β-cyanoethyl group, and
$R^3$ denotes a methyl, ethyl, propyl, butyl, β-hydroxyethyl, β-acetoxyethyl, β-propionyloxyethyl, β-hydroxypropyl, β-methoxyethyl, β-ethoxyethyl or β,γ-dihydroxypropyl group.

Dyes having the Formula I in which R denotes a methyl group or ethyl group, $R^1$ denotes a hydrogen atom or a chlorine atom, $R^2$ denotes a β-cyanoethyl, β-carbomethoxy or β-carboethoxyethyl group and $R^3$ denotes a methyl, ethyl or β-hydroxyethyl group are of particular technical interest.

The new dyes are obtained by conventional methods by coupling diazo compounds of amines having the Formula II:

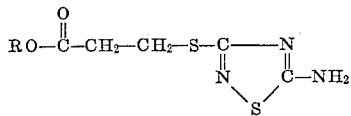

with compounds having the general Formula III:

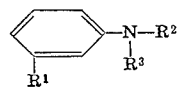

the radicals R, $R^1$, $R^2$ and $R^3$ having the above meanings.
Examples of coupling components having the Formula III are:

N-ethyl-N-β-cyanoethylaminobenzene,
N-β-hydroxyethyl-N-β-cyanoethylaminobenzene,
N-β-carbomethoxyethyl-N-β-hydroxyethylaminobenzene,
N-methyl-β-carboethoxyethylaminobenzene,
N-methyl-β-carbomethoxyethylaminobenzene,
N-propyl-β-carbomethoxyethylaminobenzene,
N-ethyl-β-cyanoethyl-3-chloroaminobenzene,
N-ethyl-N-β-cyanoethyl-3-methylaminobenzene,
N-β-cyanoethyl-N-β-hydroxyethyl-3-methylaminobenzene,
N-β-cyanoethyl-N-butyl-3-methylaminobenzene,
N-β-hydroxyethyl-N-β-cyanoethyl-3-chloroaminobenzene,
N-ethyl-N-β-acetoxyethylaminobenzene,
N-β-acetoxyethyl-N-β-cyanoethylaminobenzene,
N-β-acetoxyethyl-N-β-hydroxyethylaminobenzene,
N-β-methoxyethyl-N-β-cyanoethylaminobenzene,
N-β-methoxyethyl-N-β-carbomethoxyethylaminobenzene,
N-β-methoxyethyl-N-β-acetoxyethylaminobenzene,
N-β-cyanoethyl-N-β-methoxyethyl-3-methylaminobenzene.

The new dyes are eminently suitable, particularly in finely divided form, for dyeing for example fibers, filaments, threads, flock, woven fabrics and knitted fabrics of cellulose acetaate (secondary cellulose acetate and cellulose triacetate), linear polyesters and polyamides. They go on very well and dyeings obtained therewith are distinguished by good fastness properties. In many cases, the wet fastness, light fastness, resistance to gas-fume fading and thermal resistance are outstanding.

The invention is illustrated by the following examples. The parts and percentages are by weight; parts by volume bear the same relation to parts by weight as the liter (STP) to the kilogram.

EXAMPLE 1

25 parts of a mixture of glacial acetic acid and propionic acid (17:3) is allowed to drip at 0° to 5°C. into a mixture of 7 parts of concentrated sulfuric acid and 7.25 parts of nitrosylsulfuric acid having a content of 13.1% of free dinitrogen trioxide ($N_2O_3$). Then 5.58 parts of 3 - carbomethoxyethylmercapto - 5-aminothiadiazole-1,2,4 is introduced at 0° to 5° C. and then at the same temperature another 25 parts of the mixture of glacial acetic acid and propionic acid (17:3) is dripped in. The whole is stirred for three hours and any excess of free dinitrogen trioxide present is destroyed by adding 1 part of urea. A solution of 4.35 parts of N-ethyl-N-β-cyanoethylaminobenzene in 7.5 parts of methanol is allowed to flow gradually at 0° to 5° C. into the resultant clear diazo solution, the whole is stirred for thirty minutes at this temperature and the solution obtained is poured onto 250 parts of water and 250 parts of ice. The crystalline dye is suction filtered two hours later, washed with water until neutral and dried at 50° C. at subatmospheric pressure. It dyes cellulose acetate bright red shades having very good resistance to gas-fume fading and has the formula:

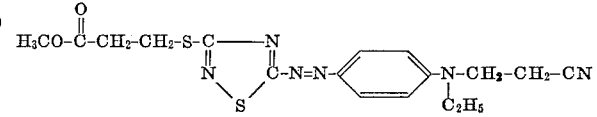

EXAMPLE 2

A diazo solution is prepared by the method described in Example 1 from 5.82 parts of 3-carboethoxyethylmercapto-5-aminothiadiazole-1,2,4. This is allowed to flow gradually into a solution consisting of 4.75 parts of N-β-hydroxyethyl-N-β-cyanoethylaminobenzene, 3 parts of concentrated hydrochloric acid, 150 parts of water, 100 parts of ice and 31 parts of anhydrous sodium acetate. The dye, isolated by a conventional method, dyes cellulose acetate neutral red shades having outstanding light fastness, resistance to gas-fume fading and wet fastness and has the formula:

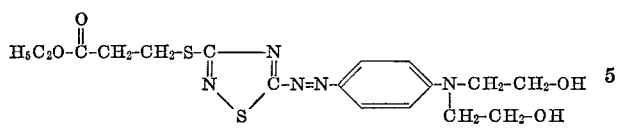

Other dyes, some of them having very good to good fastness properties on cellulose acetate or polyester, are obtained by combination of the diazo components set out in the following table with the coupling components indicated to form monoazo dyes. The diazotization and coupling is carried out as described in Example 1.

| Example No. | Diazo component | Coupling component | Shade of dyeing on— | |
|---|---|---|---|---|
| | | | Acetate | Polyester |
| 3 | $C_2H_5O-\overset{O}{\underset{\|}{C}}-C_2H_4-S-C\underset{N}{\overset{N}{=}}\underset{S}{\overset{\|}{C}}-NH_2$ | phenyl-N($C_2H_5$)($C_2H_4CN$) | Red | Red. |
| 4 | $CH_3O-\overset{O}{\underset{\|}{C}}-C_2H_4-S-C\underset{N}{\overset{N}{=}}\underset{S}{\overset{\|}{C}}-NH_2$ | phenyl-N($C_2H_4OH$)($C_2H_4CN$) | Red | Red. |
| 5 | $C_2H_5OCCH_2-S-C\underset{N}{\overset{N}{=}}\underset{S}{\overset{\|}{C}}-NH_2$ | 3-methylphenyl-N($C_2H_4OH$)($C_2H_4CN$) | Red | Red. |
| 6 | $H_3CO-\overset{O}{\underset{\|}{C}}-C_2H_4-S-C\underset{N}{\overset{N}{=}}\underset{S}{\overset{\|}{C}}-NH_2$ | 3-methylphenyl-N($C_2H_5$)($C_2H_4CN$) | Pink | Red. |
| 7 | $H_5C_2O-\overset{O}{\underset{\|}{C}}-C_2H_4-S-C\underset{N}{\overset{N}{=}}\underset{S}{\overset{\|}{C}}-NH_2$ | 3-methylphenyl-N($C_2H_5$)($C_2H_4CN$) | Pink | Red. |
| 8 | $H_5C_2O-\overset{O}{\underset{\|}{C}}-C_2H_4-S-C\underset{N}{\overset{N}{=}}\underset{S}{\overset{\|}{C}}-NH_2$ | 3-chlorophenyl-N($C_2H_4CN$)($C_2H_5$) | Scarlet | Scarlet. |
| 9 | $H_5C_2O-\overset{O}{\underset{\|}{C}}-CH_2-S-C\underset{N}{\overset{N}{=}}\underset{S}{\overset{\|}{C}}-NH_2$ | 3-chlorophenyl-N($CH_3$)($C_2H_4CN$) | Red | Red. |
| 10 | $H_3CO-\overset{O}{\underset{\|}{C}}-C_2H_4-S-C\underset{N}{\overset{N}{=}}\underset{S}{\overset{\|}{C}}-NH_2$ | phenyl-N($C_2H_4OH$)($C_2H_4C(=O)OCH_3$) | Scarlet | Scarlet. |
| 11 | $H_5C_2O-\overset{O}{\underset{\|}{C}}-C_2H_4-S-C\underset{N}{\overset{N}{=}}\underset{S}{\overset{\|}{C}}-NH_2$ | 3-chlorophenyl-N($CH_3$)($C_2H_4CO_2CH_3$) | Red | Red. |
| 12 | $CH_3O-\overset{O}{\underset{\|}{C}}-C_2H_4-S-C\underset{N}{\overset{N}{=}}\underset{S}{\overset{\|}{C}}-NH_2$ | phenyl-N($C_2H_4CN$)($C_2H_4OC(=O)CH_3$) | Scarlet | Scarlet. |
| 13 | $CH_3O-\overset{O}{\underset{\|}{C}}-C_2H_4-S-C\underset{N}{\overset{N}{=}}\underset{S}{\overset{\|}{C}}-NH_2$ | phenyl-N($C_2H_5$)($C_2H_4OC(=O)CH_3$) | Red | Red. |

We claim:
1. A dye having the general formula

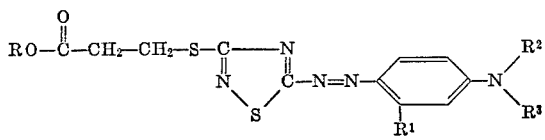

in which R denotes a member selected from the class consisting of methy and ethyl, $R^1$ denotes a member selected from the class consisting of hydrogen, chlorine and methyl, $R^2$ denotes a member selected from the class consisting of β-cyanoethyl, β-carbomethoxyethyl, β-carboethoxyethyl, β-acetoxyethyl and β-propionyloxyethyl, and $R^3$ denotes a member selected from the class consisting of methyl, ethyl, propyl, butyl, β-hydroxyethyl, β-acetoxyethyl, β-propionyloxyethyl, β-methoxyethyl, β-ethoxyethyl, β-hydroxypropyl and β,γ-dihydroxypropyl.

2. A dye having the general formula

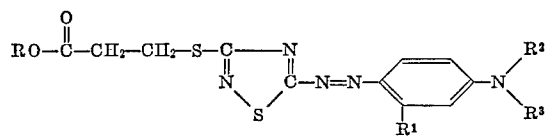

in which R denotes a member selected from the class consisting of methyl and ethyl, $R^1$ denotes a member selected from the class consisting of hydrogen and chlorine, $R^2$ denotes a member selected from the class consisting of β-cyanoethyl, β-carbomethoxyethyl and β-carboethoxyethyl, and $R^3$ denotes a member selected from the class consisting of methyl, ethyl and β-hydroxyethyl.

3. The dyes of the formula

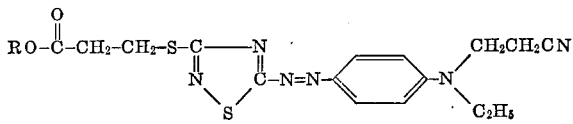

where R denotes a member selected from the class consisting of methyl and ethyl.

4. The dyes of the formula

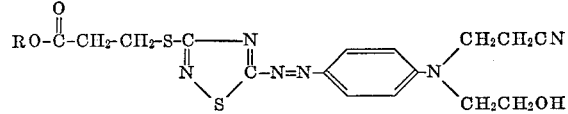

where R denotes a member selected from the class consisting of methyl and ethyl.

5. The dyes of the formula

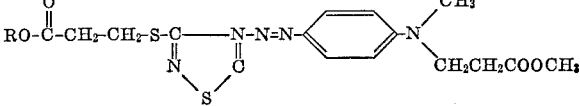

where R denotes a member selected from the class consisting of methyl and ethyl.

References Cited

UNITED STATES PATENTS
3,221,006  11/1965  Moore et al. _____ 260—158

CHARLES B. PARKER, *Primary Examiner.*

D. M. PAPUGA, *Assistant Examiner.*

U.S. Cl. X.R.

260—306.8, 415; 8—41, 55

U.S. DEPARTMENT OF COMMERCE
PATENT OFFICE
Washington, D.C. 20231

UNITED STATES PATENT OFFICE
CERTIFICATE OF CORRECTION

Patent No. 3,441,554                              April 29, 1969

Erwin Hahn et al.

It is certified that error appears in the above identified patent and that said Letters Patent are hereby corrected as shown below:

Columns 3 and 4, in the table, second column, that portion of the formula reading "$C_2H_5OCCH_2$" should read --

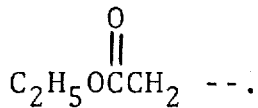
 -- .

Signed and sealed this 21st day of April 1970.

(SEAL)
Attest:

Edward M. Fletcher, Jr.                      WILLIAM E. SCHUYLER, JR.
Attesting Officer                                Commissioner of Patents